(12) United States Patent
Stahl

(10) Patent No.: US 11,914,646 B1
(45) Date of Patent: Feb. 27, 2024

(54) GENERATING TEXTUAL CONTENT BASED ON AN EXPECTED VIEWING ANGLE

(71) Applicant: Apple Inc., Cupertino, CA (US)

(72) Inventor: Geoffrey Stahl, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/850,093

(22) Filed: Jun. 27, 2022

Related U.S. Application Data

(60) Provisional application No. 63/248,363, filed on Sep. 24, 2021.

(51) Int. Cl.
| | |
|---|---|
| *G06F 16/783* | (2019.01) |
| *H04N 13/183* | (2018.01) |
| *G06F 40/10* | (2020.01) |
| *G06F 3/04815* | (2022.01) |
| *G02F 1/13* | (2006.01) |

(52) U.S. Cl.
CPC .......... *G06F 16/783* (2019.01); *G02F 1/1323* (2013.01); *G06F 3/04815* (2013.01); *G06F 40/10* (2020.01); *H04N 13/183* (2018.05)

(58) Field of Classification Search
CPC .... G06F 16/783; G06F 3/04815; G06F 40/10; G02F 1/1323; H04N 13/183
See application file for complete search history.

(56) References Cited

U.S. PATENT DOCUMENTS

| | | | | |
|---|---|---|---|---|
| 10,379,610 | B2 * | 8/2019 | Yasuda | G06F 3/013 |
| 2012/0131491 | A1 * | 5/2012 | Lee | G06F 3/013 |
| | | | | 715/776 |
| 2012/0212508 | A1 * | 8/2012 | Kimball | G02B 27/0093 |
| | | | | 345/633 |
| 2018/0321798 | A1 * | 11/2018 | Kawamura | G06F 3/0481 |
| 2021/0020142 | A1 * | 1/2021 | Ooi | G06F 3/011 |

* cited by examiner

*Primary Examiner* — Jitesh Patel
(74) *Attorney, Agent, or Firm* — Fernando & Partners, LLP

(57) ABSTRACT

In accordance with some implementations, a method is performed at an electronic device including one or more processors, a non-transitory memory, a positional sensor, a rendering system, and a display. The method includes while displaying, on the display, first textual content according to an initial viewing angle, determining an expected viewing angle based on the initial viewing angle and positional data from the positional sensor. The positional data indicates a positional change of the electronic device. The initial viewing angle is different from the expected viewing angle. The method includes, in accordance with a determination that the expected viewing angle satisfies a render criterion, generating, via the rendering system, second textual content based on the expected viewing angle. The method includes displaying, on the display, the second textual content according to the expected viewing angle.

21 Claims, 10 Drawing Sheets

GENERATING TEXTUAL CONTENT BASED ON AN EXPECTED VIEWING ANGLE

CROSS-REFERENCE TO RELATED APPLICATION

This application claims priority to U.S. Provisional Patent App. No. 63/248,363, filed on Sep. 24, 2021, and hereby incorporated by reference in its entirety.

TECHNICAL FIELD

The present disclosure relates to generating content, and in particular generating textual content via a rendering system.

BACKGROUND

According to various circumstances, a device may display, on a display, textual content within an environment. For example, a positional change of the device results in a change of viewing angle between the device and the textual content. The change of the viewing angle often results in a degradation of the textual content on the display. Certain techniques account for the viewing angle change, but the techniques are inefficient and computationally expensive.

SUMMARY

In accordance with some implementations, a method is performed at an electronic device including one or more processors, a non-transitory memory, a positional sensor, a rendering system, and a display. The method includes while displaying, on the display, first textual content according to an initial viewing angle, determining an expected viewing angle based on the initial viewing angle and positional data from the positional sensor. The positional data indicates a positional change of the electronic device. The initial viewing angle is different from the expected viewing angle. The method includes, in accordance with a determination that the expected viewing angle satisfies a render criterion, generating, via the rendering system, second textual content based on the expected viewing angle. The method includes displaying, on the display, the second textual content according to the expected viewing angle.

In accordance with some implementations, a method is performed at an electronic device including one or more processors, a non-transitory memory, a positional sensor, a rendering system, and a display. The one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of an electronic device, cause the device to perform or cause performance of the operations of any of the methods described herein. In accordance with some implementations, an electronic device includes means for performing or causing performance of the operations of any of the methods described herein. In accordance with some implementations, an information processing apparatus, for use in an electronic device, includes means for performing or causing performance of the operations of any of the methods described herein.

BRIEF DESCRIPTION OF THE DRAWINGS

For a better understanding of the various described implementations, reference should be made to the Description, below, in conjunction with the following drawings in which like reference numerals refer to corresponding parts throughout the figures.

DESCRIPTION

Figure 1:
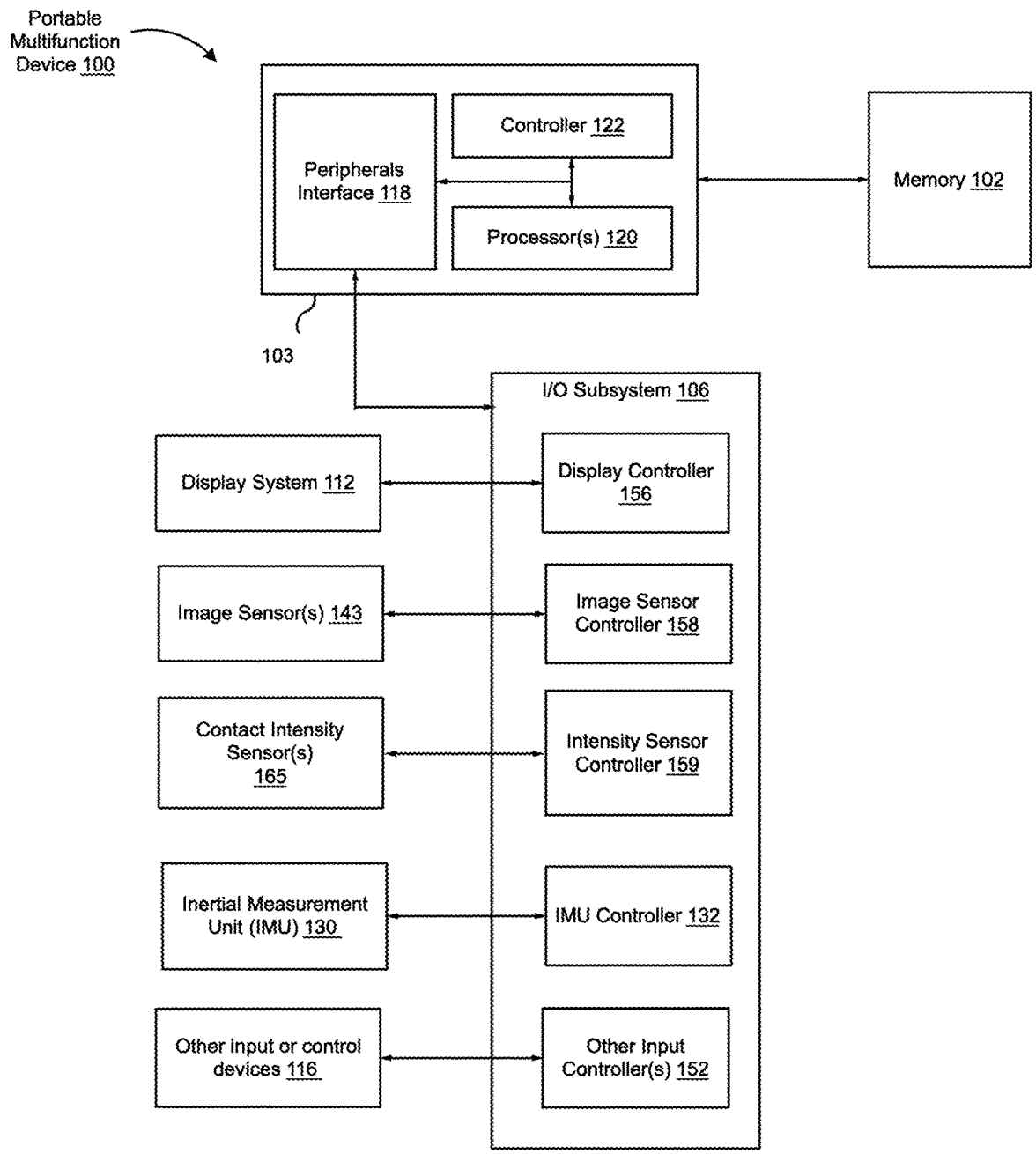
FIG. 1 is a block diagram of an example of a portable multifunction device in accordance with some implementations.

A device may display, on a display, textual content in an environment, such as displaying the textual content as world-locked to a portion of the environment or body-locked to a user of the device. For example, a positional change of the device results in a change of a viewing angle between the device and the textual content. The change of the viewing angle often results in a degradation of the textual content on the display. For example, the change of the viewing angle causes a distortion of a portion of the textual content. The distortion may correspond to a stretching of the portion of the textual content, due to inadequate rendering of corresponding pixels. For example, a rendering system generates an adequate number of pixels for a first portion of the textual content, but generates an inadequate number of pixels for a second portion of the textual content, resulting in a stretching of the second portion of the textual content. The first portion of the textual content may be closer (e.g., lower depth) to the device than is the second portion of the textual content. Certain techniques account for the viewing angle change, but these techniques are inefficient and computationally expensive. For example, one technique includes rendering text at different sizes to account for the viewing angle change, whereas another technique includes generating vector-based text, which is also computationally expensive and inefficient.

By contrast, various implementations disclosed herein include methods, systems, and electronic devices for generating textual content based on an expected viewing angle. To that end, a method includes determining the expected viewing angle based on the initial (e.g., current) viewing angle and positional data from a positional sensor. The positional data indicates a positional change of the electronic device. For example, the positional data includes sensor data from an inertial measurement unit (IMU), such as an angular velocity data. The method includes determining whether or not the expected viewing angle satisfies a render criterion. For example, the expected viewing angle satisfies the render criterion when a difference between the initial viewing angle and the expected viewing angle exceeds a threshold. In accordance with a determination that the expected viewing angle satisfies the render criterion, the method includes generating, via a rendering system, second textual content based on the expected viewing angle. For example, the rendering system includes a graphics processing unit (GPU) that generates the second textual content by shifting the perspective of the first textual content according to a difference between the expected viewing angle and the initial viewing angle.

In some implementations, the method includes determining an operational value for the rendering system based on the expected viewing angle, and generating the second textual content according to the operational value. For example, the operational value indicates a plurality of resolution values respectively associated with a plurality of portions of the second textual content. A particular portion of the second textual content may have a relatively high resolution value based on the particular portion being associated with a relatively low depth with respect to the display. Continuing with this example, by generating the particular portion of the second textual content with the relatively high resolution value, the rendering system avoids distorting (e.g., stretching) the particular portion of the second textual content.

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described implementations. The first contact and the second contact are both contacts, but they are not the same contact, unless the context clearly indicates otherwise.

The terminology used in the description of the various described implementations herein is for the purpose of describing particular implementations only and is not intended to be limiting. As used in the description of the various described implementations and the appended claims, the singular forms "a", "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina.

Projection systems also may be configured to project virtual objects into the physical environment, for example, as a hologram or on a physical surface.

FIG. 1 is a block diagram of an example of a portable multifunction device 100 (sometimes also referred to herein as the "electronic device 100" for the sake of brevity) in accordance with some implementations. The electronic device 100 includes memory 102 (e.g., one or more non-transitory computer readable storage mediums), a memory controller 122, one or more processing units (CPUs) 120, a peripherals interface 118, an input/output (I/O) subsystem 106, a display system 112, an inertial measurement unit (IMU) 130, image sensor(s) 143 (e.g., camera), contact intensity sensor(s) 165, and other input or control device(s) 116. In some implementations, the electronic device 100 corresponds to one of a mobile phone, tablet, laptop, wearable computing device, head-mountable device (HMD), head-mountable enclosure (e.g., the electronic device 100 slides into or otherwise attaches to a head-mountable enclosure), or the like. In some implementations, the head-mountable enclosure is shaped to form a receptacle for receiving the electronic device 100 with a display.

In some implementations, the peripherals interface 118, the one or more processing units 120, and the memory controller 122 are, optionally, implemented on a single chip, such as a chip 103. In some other implementations, they are, optionally, implemented on separate chips.

The I/O subsystem 106 couples input/output peripherals on the electronic device 100, such as the display system 112 and the other input or control devices 116, with the peripherals interface 118. The I/O subsystem 106 optionally includes a display controller 156, an image sensor controller 158, an intensity sensor controller 159, one or more input controllers 152 for other input or control devices, and an IMU controller 132, The one or more input controllers 152 receive/send electrical signals from/to the other input or control devices 116. The other input or control devices 116 optionally include physical buttons (e.g., push buttons, rocker buttons, etc.), dials, slider switches, joysticks, click wheels, and so forth. In some alternate implementations, the one or more input controllers 152 are, optionally, coupled with any (or none) of the following: a keyboard, infrared port, Universal Serial Bus (USB) port, stylus, finger-wearable device, and/or a pointer device such as a mouse. The one or more buttons optionally include a push button. In some implementations, the other input or control devices 116 includes a positional system (e.g., GPS) that obtains information concerning the location and/or orientation of the electronic device 100 relative to a particular object. In some implementations, the other input or control devices 116 include a depth sensor and/or a time-of-flight sensor that obtains depth information characterizing a physical object within a physical environment. In some implementations, the other input or control devices 116 include an ambient light sensor that senses ambient light from a physical environment and outputs corresponding ambient light data.

The display system 112 provides an input interface and an output interface between the electronic device 100 and a user. The display controller 156 receives and/or sends electrical signals from/to the display system 112. The display system 112 displays visual output to the user. The visual output optionally includes graphics, text, icons, video, and any combination thereof (sometimes referred to herein as "computer-generated content"). In some implementations, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

The display system 112 may have a touch-sensitive surface, sensor, or set of sensors that accepts input from the user based on haptic and/or tactile contact. The display system 112 and the display controller 156 (along with any associated modules and/or sets of instructions in the memory 102) detect contact (and any movement or breaking of the contact) on the display system 112 and converts the detected contact into interaction with user-interface objects (e.g., one or more soft keys, icons, web pages or images) that are displayed on the display system 112. In an example implementation, a point of contact between the display system 112 and the user corresponds to a finger of the user or a finger-wearable device.

The display system 112 optionally uses LCD (liquid crystal display) technology, LPD (light emitting polymer display) technology, or LED (light emitting diode) technology, although other display technologies are used in other implementations. The display system 112 and the display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the display system 112.

The user optionally makes contact with the display system 112 using any suitable object or appendage, such as a stylus, a finger-wearable device, a finger, and so forth. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

The inertial measurement unit (IMU) 130 includes accelerometers, gyroscopes, and/or magnetometers in order to measure various forces, angular rates, and/or magnetic field information with respect to the electronic device 100. Accordingly, according to various implementations, the IMU 130 detects one or more positional change inputs of the electronic device 100, such as the electronic device 100 being shaken, rotated, moved in a particular direction, and/or the like.

The image sensor(s) 143 capture still images and/or video. In some implementations, an image sensor 143 is located on the back of the electronic device 100, opposite a touch screen on the front of the electronic device 100, so that the touch screen is enabled for use as a viewfinder for still and/or video image acquisition. In some implementations, another image sensor 143 is located on the front of the electronic device 100 so that the user's image is obtained (e.g., for selfies, for videoconferencing while the user views the other video conference participants on the touch screen, etc.). In some implementations, the image sensor(s) are integrated within an HMD. For example, the image sensor(s) 143 output image data that represents a physical object (e.g., a physical agent) within a physical environment.

The contact intensity sensors 165 detect intensity of contacts on the electronic device 100 (e.g., a touch input on a touch-sensitive surface of the electronic device 100). The contact intensity sensors 165 are coupled with the intensity sensor controller 159 in the I/O subsystem 106. The contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). The contact intensity sensor(s) 165 receive contact intensity information (e.g., pressure information or a proxy for pressure information) from the physical environment. In some implementations, at least one contact intensity sensor 165 is collocated with, or proximate to, a touch-sensitive surface of the electronic device 100. In some implementations, at least one contact intensity sensor 165 is located on the side of the electronic device 100.

Figure 2A:
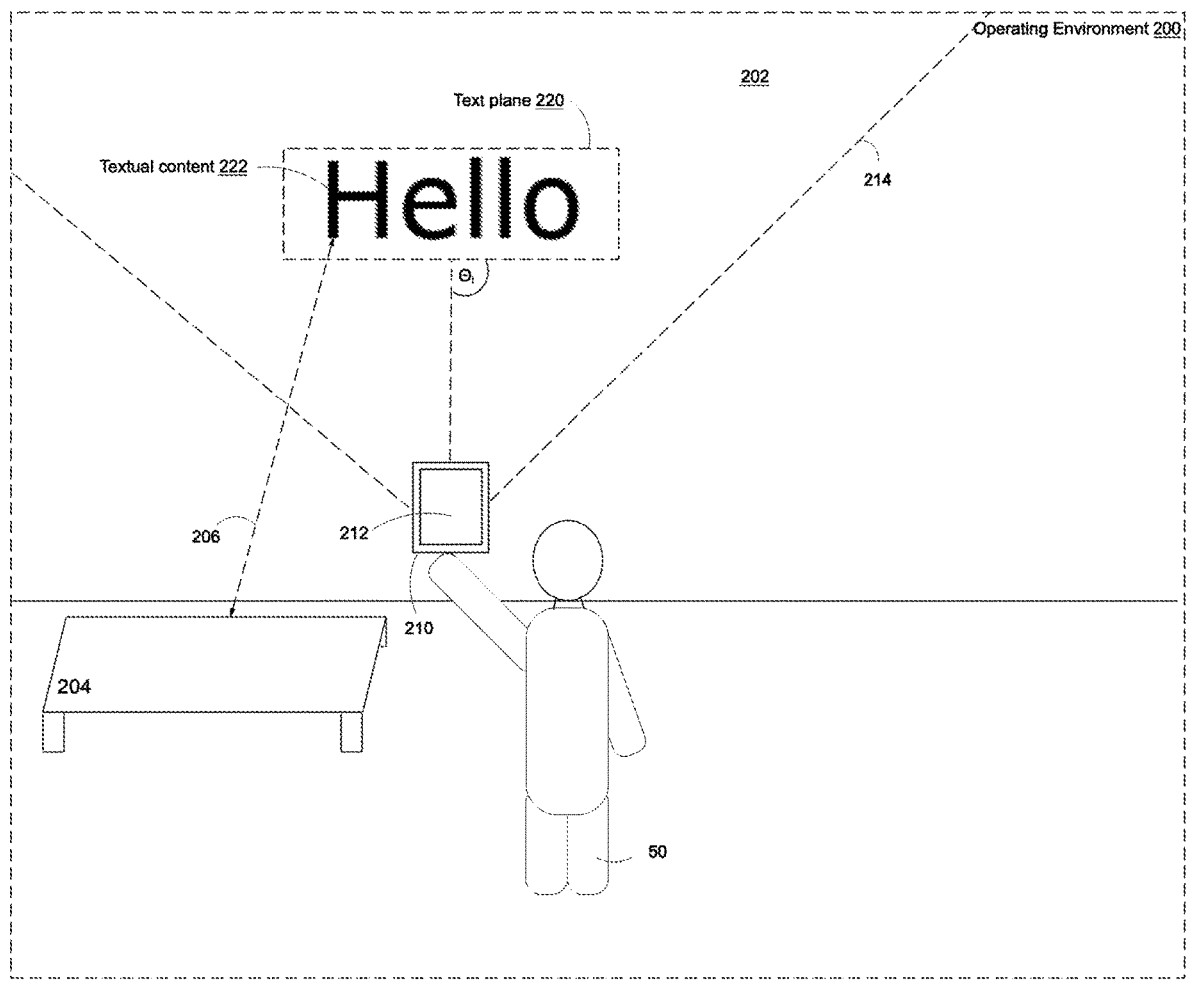
FIGS. 2A-2C are an example of degradation of textual content based on a change of viewing angle.
Figure 2B:
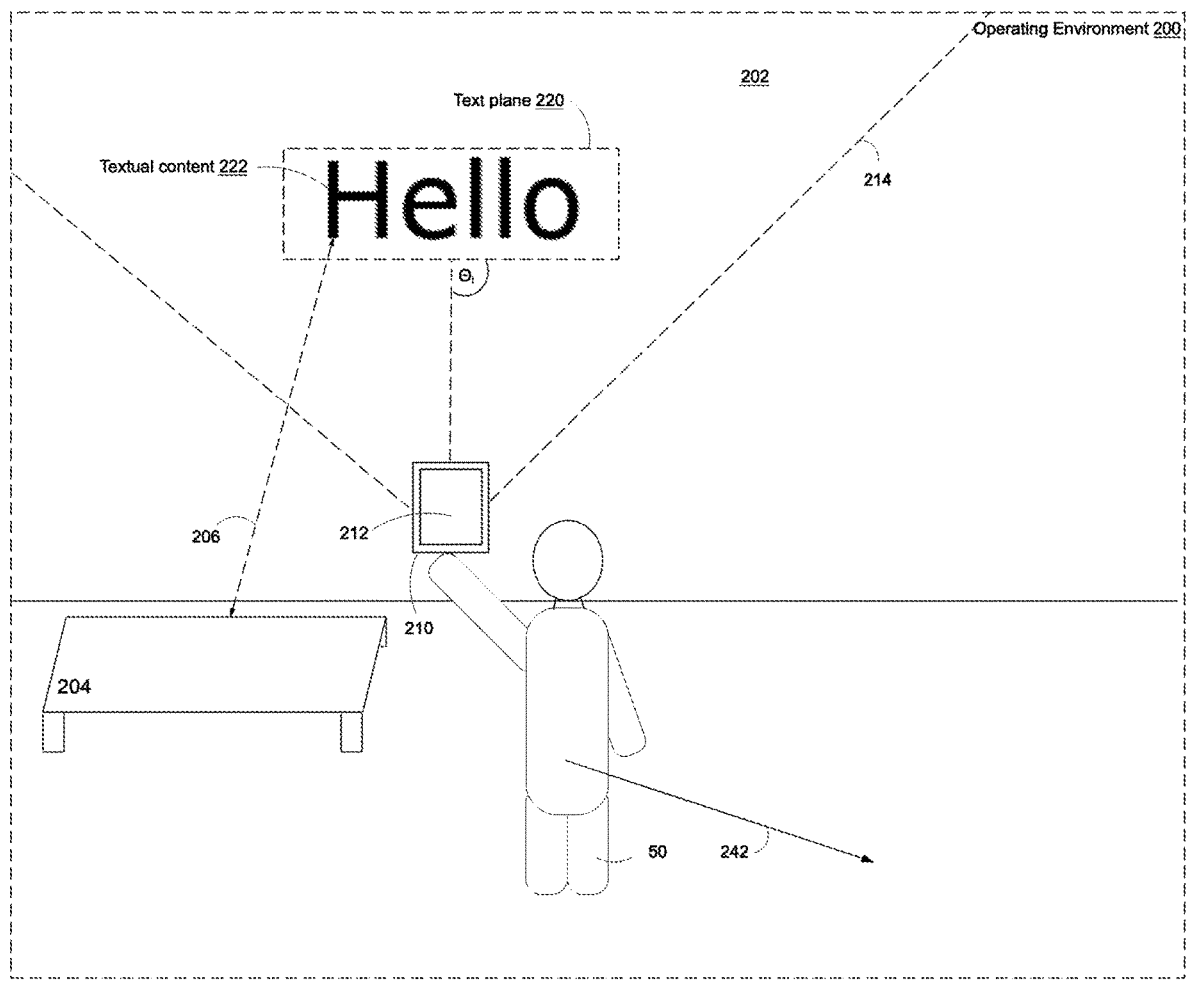
Figure 2C:
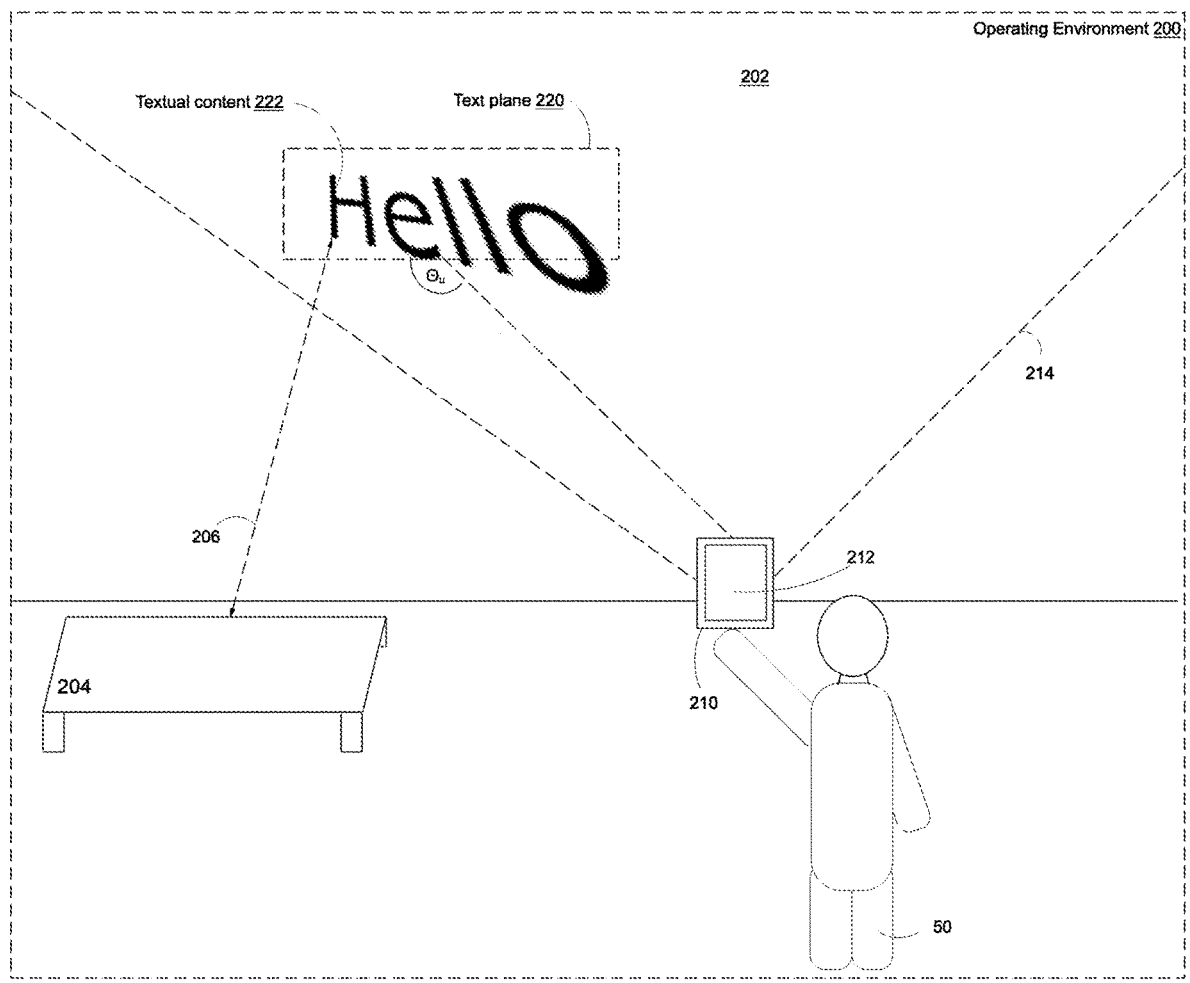

FIGS. 2A-2C are an example of degradation of textual content based on a change of viewing angle. As illustrated in FIG. 2A, a user 50 is holding an electronic device 210. The electronic device 210 operates according to an operating environment 200, such as an XR environment generated by the electronic device 210. The operating environment 200 includes a physical wall 202 and a physical table 204.

The electronic device 210 includes a display 212 that displays various features of the operating environment 200. The display 212 is associated with a viewable region 214, which includes a portion of the physical wall 202.

The electronic device 210 includes a rendering system, which generates textual content 222 corresponding to "Hello." Moreover, the electronic device 210 displays, on the display 212, the textual content 222 overlaid onto the physical wall 202, as illustrated in FIG. 2A. In some implementations, the textual content 222 is world-locked to a portion of a physical environment. For example, as illustrated in FIG. 2A, the textual content 222 is world-locked to a point on the physical table 204, as indicated by reference line 206.

Moreover, the textual content 222 exists within a text plane 220. Based on the current position of the electronic device 210 relative to the text plane 220, the electronic device 210 displays the textual content 222 according to an initial viewing angle $\theta_i$ that is approximately 90 degrees. The initial viewing angle $\theta_i$ characterizes a positional relationship between the textual content 222 and the display 212. In other words, the initial viewing angle $\theta_i$ of 90 degrees is due to the position (e.g., orientation) of the textual content 222 being approximately perpendicular to the position (e.g., orientation) of the display 212.

As illustrated in FIG. 2B, the user 50 and the electronic device 210 move to a different location within the operating environment 200, as indicated by a movement line 242. Based on the movement, the viewing angle changes from the initial viewing angle $\theta_i$ to an updated viewing angle $\theta_u$, as illustrated in FIG. 2C. The rendering system does not generate updated textual content that accounts for the movement of the electronic device 210. Accordingly, the rendering system continues to generate the same textual content 222, and the display 212 includes the textual content 222. However, the textual content 222 is perspective distorted (e.g., stretched). For example, the rendering system generates a first portion of the textual content 222 nearer to the electronic device (e.g., the "o" of "Hello") with more pixels than a second portion of the textual content 222 farther from the electronic device (e.g., the "H" of "Hello"), resulting in textual content that appears stretched.

Figure 3A:
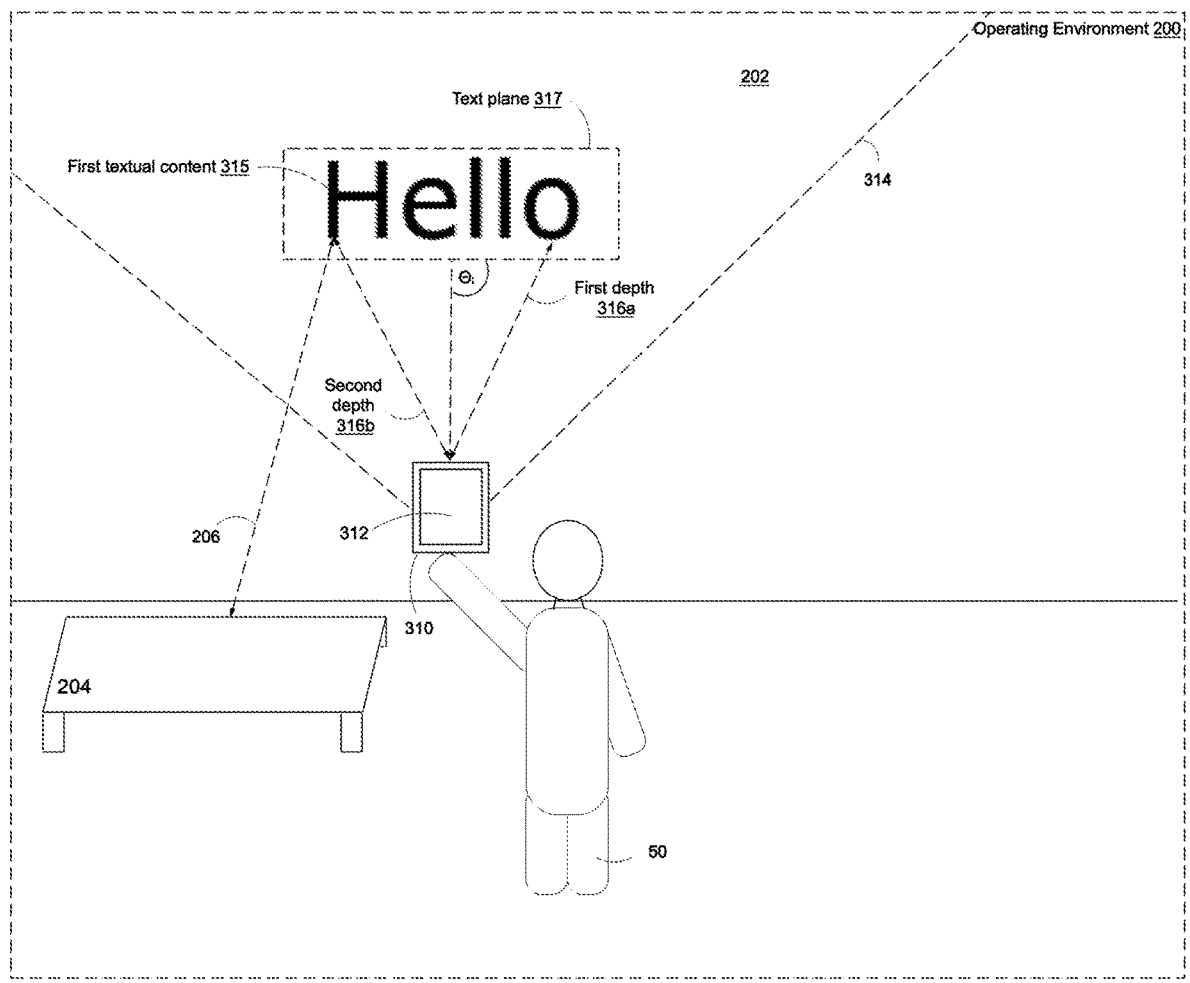
FIGS. 3A-3D are examples of generating textual content based on expected viewing angles in accordance with some implementations.

FIGS. 3A-3D are examples of generating textual content based on expected viewing angles in accordance with some implementations. As illustrated in FIG. 3A, the user 50 is holding an electronic device 310 including a display 312. In some implementations, the electronic device 210 corresponds to a mobile device, such as a smartphone, tablet, wearable device, and/or the like. The electronic device 310 operates according to the operating environment 200 described with reference to FIG. 2A-2C.

The display 312 is associated with a viewable region 314, which includes a portion of the physical wall 202. The display 312 includes first textual content 315 corresponding to "Hello," wherein the first textual content 315 is associated with a text plane 317. The first textual content 315 is displayed according to an initial viewing angle which is approximately 90 degrees. Accordingly, the position (e.g., orientation) of the display 312 within the operating environment 200 is substantially perpendicular to the position (e.g., orientation) of first textual content 315 within the operating environment 200. In some implementations, the first textual content 315 is overlaid on the physical wall 202. Moreover, in some implementations, the first textual content 315 is world-locked to the physical table 204, as indicated by the reference line 206.

In some implementations, the electronic device 310 corresponds to a head-mountable device (HMD) that includes an integrated display (e.g., a built-in display). In some implementations, the electronic device 310 includes a head-mountable enclosure. In various implementations, the head-mountable enclosure includes an attachment region to which another device with a display can be attached. In various implementations, the head-mountable enclosure is shaped to form a receptacle for receiving another device that includes a display (e.g., the electronic device 310). For example, in some implementations, the electronic device 310 slides/snaps into or otherwise attaches to the head-mountable enclosure.

In some implementations, the electronic device 310 includes an image sensor, such as a scene camera. For example, in some implementations and with reference to FIG. 4, the electronic device 310 includes an image sensor 402 that captures image data 404 of a physical environment 401 including the portion of the physical wall 202.

Figure 4:
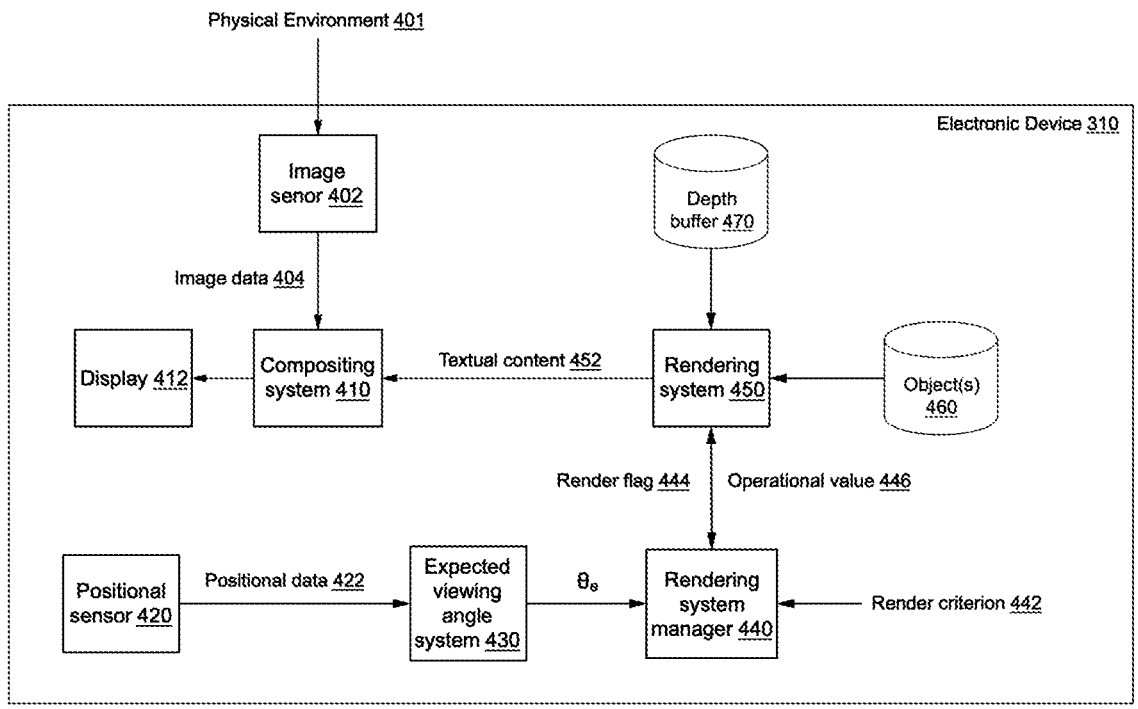
FIG. 4 is an example of a block diagram of an electronic device that generates textual content based on an expected viewing angle in accordance with some implementations.

With continued reference to FIG. 4, the electronic device 310 includes a rendering system 450 that generates textual content 452 by rendering one or more objects 460 (e.g., stored in an object datafile). For example, the object(s) 460 include various textual objects, such as different font types, sizes, etc. In some implementations, example, the rendering system 450 includes a graphics processing unit (GPU) that performs the rendering. In some implementations, the electronic device 310 includes a depth buffer 470 that the rendering system 450 utilizes in order to generate the textual content 452, as will be described below. In some implementations, the rendering system 450 populates the depth buffer 470 while drawing a three-dimensional (3D) environment (e.g., on a triangle-by-triangle basis). For example, the rendering system 450 populates the depth buffer 470 with a plurality of depth values respectively associated with a plurality of portions of the textual content 452. As one example, referring back to FIG. 3A, the electronic device 310 populates the depth buffer 470 with a first depth 316a corresponding to a depth of the letter "o" of "Hello," and populates the depth buffer 470 with a second depth 316b corresponding to a depth of the letter "H" of "Hello."

Referring back to FIG. 4, in some implementations, the electronic device 310 includes a compositing system 410 that composites the textual content 452 with the image data 404 of the physical environment 401. The compositing system 410 outputs the composited data to a display 412, enabling the display 412 to present an XR environment to the user 50.

Figure 3B:
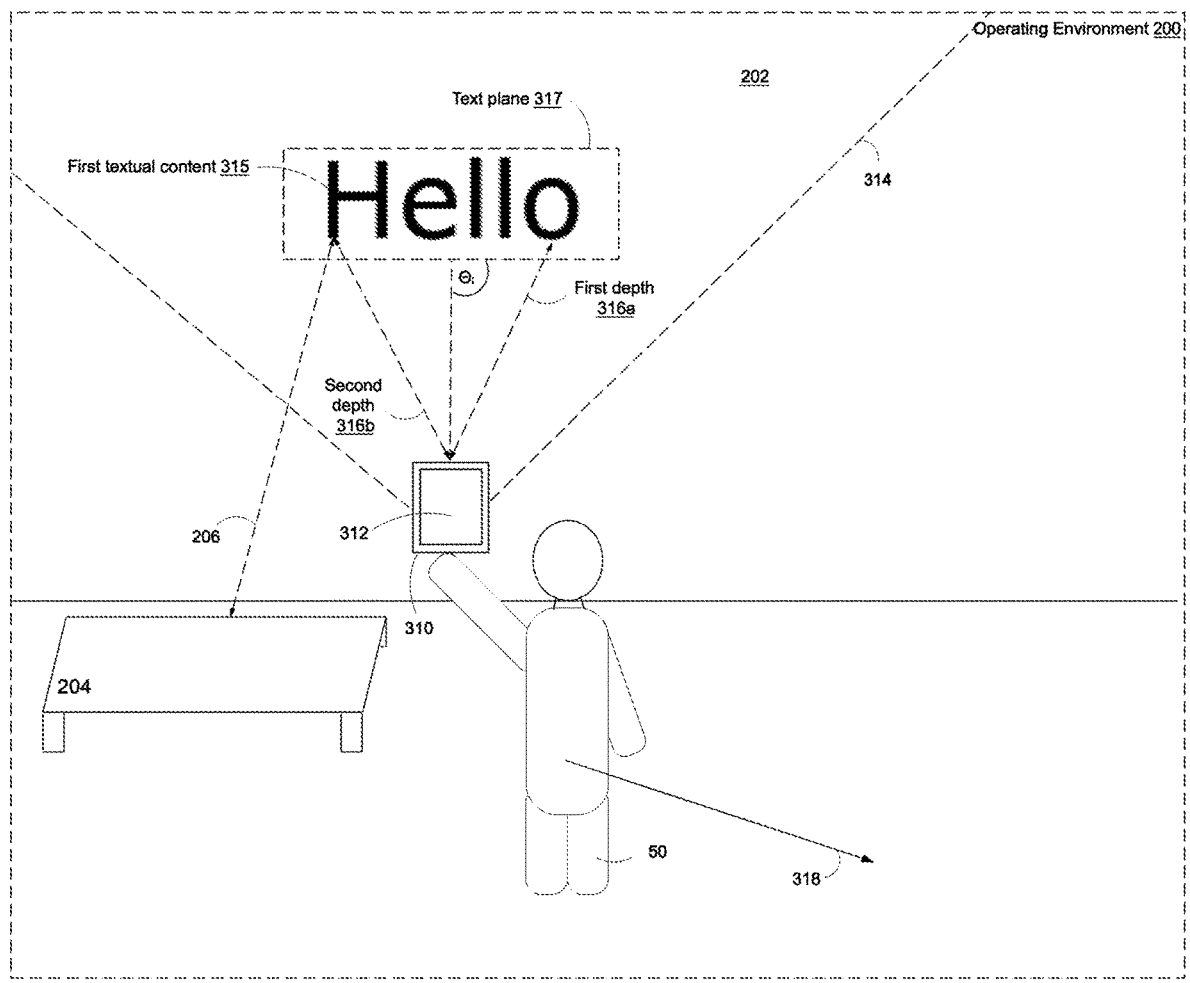

Turning to FIG. 3B, the user 50 and the electronic device 310 move to a different location within the operating environment 200, as indicated by a movement line 318. The movement is rightwards along the physical wall 202 and away from (increasing depth with respect to) the physical wall 202. Based on the movement, the electronic device 310 detects a positional change of the electronic device 310. To that end, referring back to FIG. 4, the electronic device 310 includes a positional sensor 420 that generates positional data 422 indicative of the positional change. For example, the positional sensor 420 corresponds to an IMU that generates angular velocity data as part of the positional data 422. As another example, the positional sensor 420 corresponds to a magnetic sensor that generates magnetic data as part of the positional data 422.

Figure 3C:
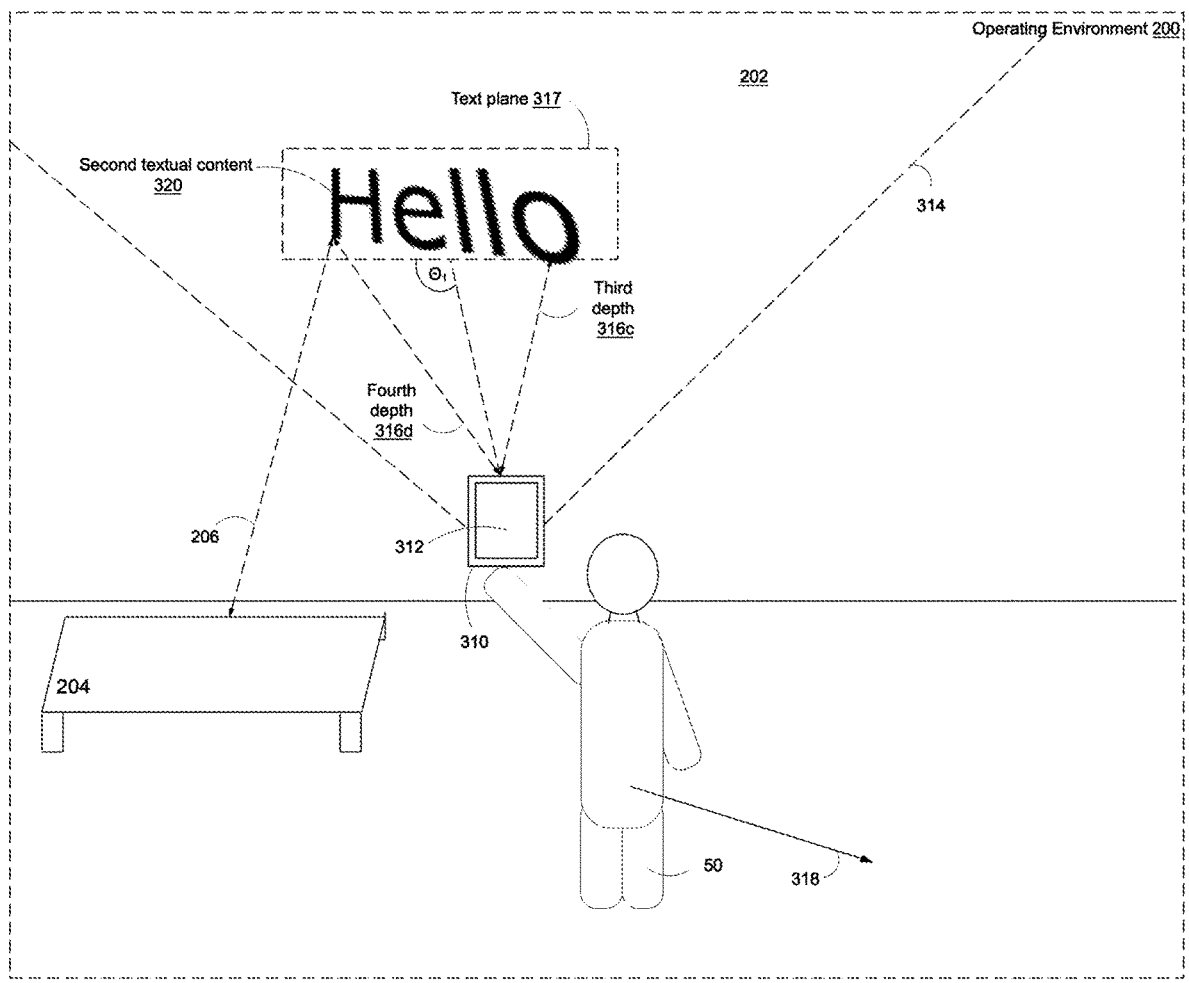

With continued reference to FIG. 4, the electronic device 310 includes an expected viewing angle system 430. The expected viewing angle system 430 determines an expected viewing angle $\theta_e$ based on the initial viewing angle $\theta_i$ and the positional data 422. The expected viewing angle $\theta_e$ is different from the initial viewing angle $\theta_i$. For example, the expected viewing angle system 430 determines a first viewing angle $\theta_1$, different from the initial viewing angle $\theta_i$, based on the positional data 422. The first viewing angle $\theta_1$ is illustrated in FIG. 3C, after the user 50 has begun moving along the movement line 318. Notably, the expected viewing angle system 430 determines the first viewing angle $\theta_1$ before the electronic device 310 reaches the position illustrated in FIG. 3C. In other words, the expected viewing angle system 430 anticipates the first viewing angle $\theta_1$, enabling the electronic device 310 to proactively update rendering of the textual content 452 before the electronic device 310 reaches the first viewing angle $\theta_1$.

To that end, referring back to FIG. 4, the electronic device 310 includes a rendering system manager 440 that directs the rendering system 450 to update rendering based on the expected viewing angle $\theta_e$ and a render criterion 442. For example, the render criterion 442 is satisfied when a difference between the expected viewing angle $\theta_e$ and the initial viewing angle $\theta_i$ exceeds a threshold. Accordingly, the rendering system manager 440 directs the rendering system 450 to update rendering (e.g., re-render) of the object(s) 460 based on the expected viewing angle $\theta_e$. For example, in some implementations, the rendering system manager 440 sets a render flag 444 to '1' in order to direct the rendering system 450 to generate updated textual content 452. As a counterexample, when the render criterion 442 is not satisfied, the rendering system manager 440 sets the render flag 444 to '0' in order to direct the rendering system 450 to forego generating updated textual content. Foregoing rendering in certain circumstances reduces overall resource utilization by the electronic device 310.

Referring back to FIG. 3C, the rendering system manager 440 determines that the first viewing angle $\theta_1$ satisfies the rendering criterion 442 (e.g., sufficiently different from the initial viewing angle $\theta_i$), and directs the rendering system 450 to generate second textual content 320. The second textual content 320 is associated with the first viewing angle $\theta_1$. Accordingly, as illustrated in FIG. 3C, the second textual content 320 appears less distorted than the textual content 222 of FIG. 2C, due to the proactive re-rendering based on the (expected) first viewing angle $\theta_1$.

In some implementations, the rendering system manager 440 determines that the first viewing angle $\theta_1$ does not satisfy the rendering criterion 442 (e.g., sufficiently similar to the initial viewing angle $\theta_i$), and directs the rendering system 450 to forego generating the second textual content 320. For example, based on determining that the rendering criterion 442 is not satisfied, the electronic device 310 processes (e.g., performs image warping on) the first textual content 315, and directs the rendering system 450 to not re-render the first textual content 315. As one example, the electronic device 310 processes the first textual content 315 such that the processed first textual content is associated with an acceptable distortion level. Further details regarding processing textual content are described with reference to block 514 of the method 500.

In some implementations, the updated rendering is based on one or more depths associated with the first viewing angle $\theta_1$. For example, as illustrated in FIG. 3C, the rendering system 450 obtains, from the depth buffer 470, a third depth 316c associated with "o" of "Hello" and a fourth depth 316d associated with "H" of "Hello." Because the movement is away from the physical wall 202, the third depth 316c is larger than the first depth 316a (also associated with "o" of "Hello"). Moreover, the fourth depth 316d is larger than the second depth 316b (also associated with "H" of "Hello").

In some implementations, the rendering system manager 440 determines an operational value 446 based on the expected viewing angle $\theta_e$. The rendering system manager 440 provides the operational value 446 to the rendering system 450. In turn, the rendering system 450 may use the operational value 446 in order to render the object(s) 460 for generation of the textual content 452. For example, the operational value 446 indicates a higher resolution rendering parameter for text that is nearer to (e.g., lower depth with respect to) the display. As one example, with reference to FIG. 3C, the rendering system 450 may generate the "o" of "Hello" at a higher resolution than the "H" of "Hello," based on the third depth 316c being less than the fourth depth 316d. As another example, the operational value 446 indicates a rendering frequency (e.g., frames per second (FPS)) at which the rendering system 450 generates the textual content 452. Accordingly, the rendering system manager 440 may direct the rendering system 450 as to whether or not to perform a rendering operation, but may also direct the rendering system 450 as to how to perform the rendering operation.

Figure 3D:
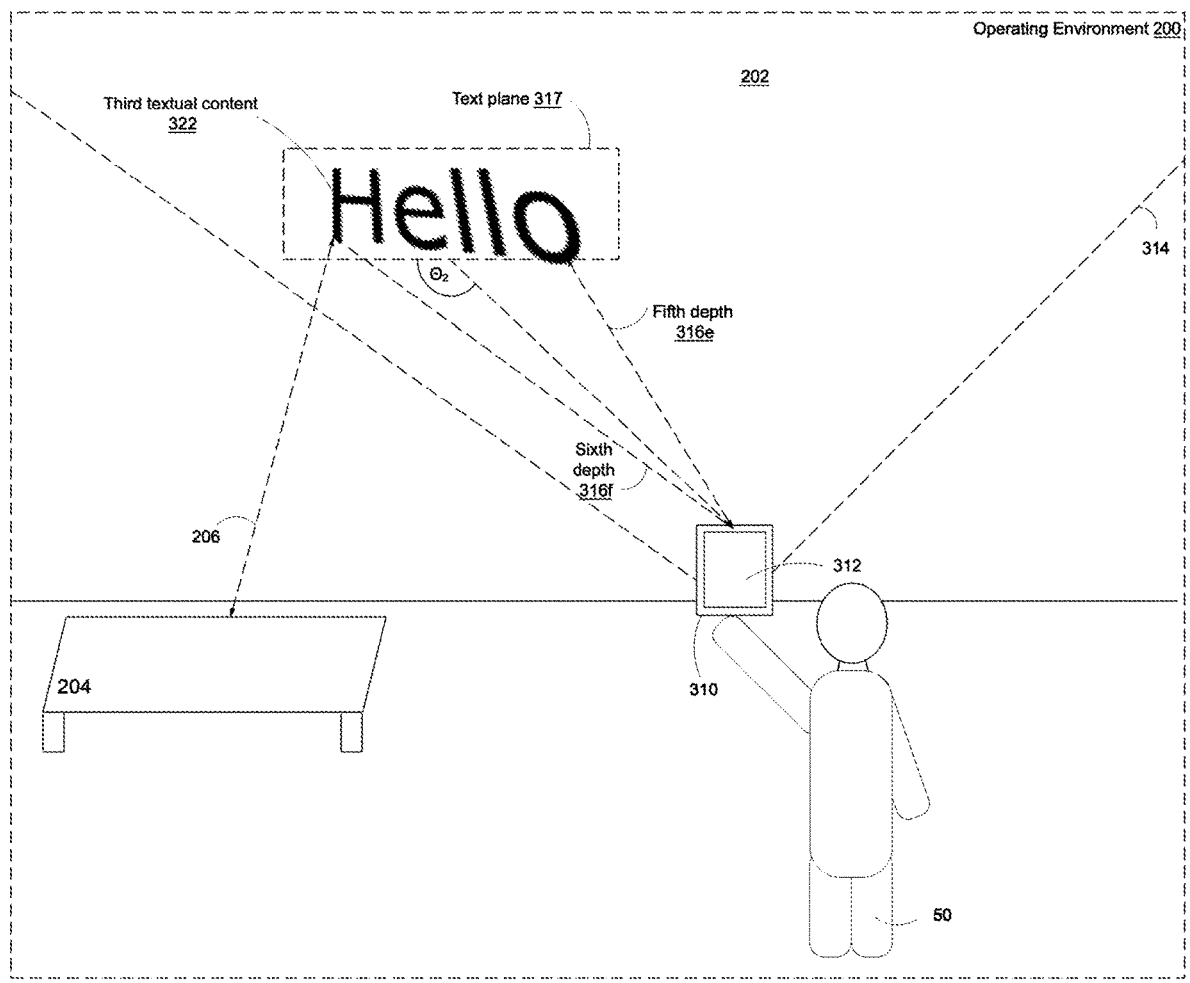

As illustrated in FIG. 3D, the user 50 finishes the movement, and accordingly the electronic device 310 is associated with a second viewing angle $\theta_2$ with respect to the text plane 317. During the transition from the first viewing angle $\theta_1$ to the second viewing angle $\theta_2$, the expected viewing angle system 430 obtains additional positional data 422, and determines the (expected) second viewing angle $\theta_2$ before the electronic device 310 reaches the second viewing angle $\theta_2$. Determining the second viewing angle $\theta_2$ enables the rendering system 450 to proactively generate third textual content 322. The third textual content 322 is associated with the second viewing angle $\theta_2$. Upon reaching the second viewing angle $\theta_2$, the electronic device 310 displays, on the display 312, the generated third textual content 322, as illustrated in FIG. 3D. Accordingly, the displayed third textual content 322 appears less distorted than the textual content 222 of FIG. 2C. In some implementations, the rendering system 450 proactively obtains a fifth depth 316e and a sixth depth 316f respectively associated with "o" and "H" illustrated in FIG. 3D, based on the anticipated second viewing angle $\theta_2$. The rendering system 450 may use the fifth depth 316e and the sixth depth 316f in order to generate the third textual content 322.

Figure 5:
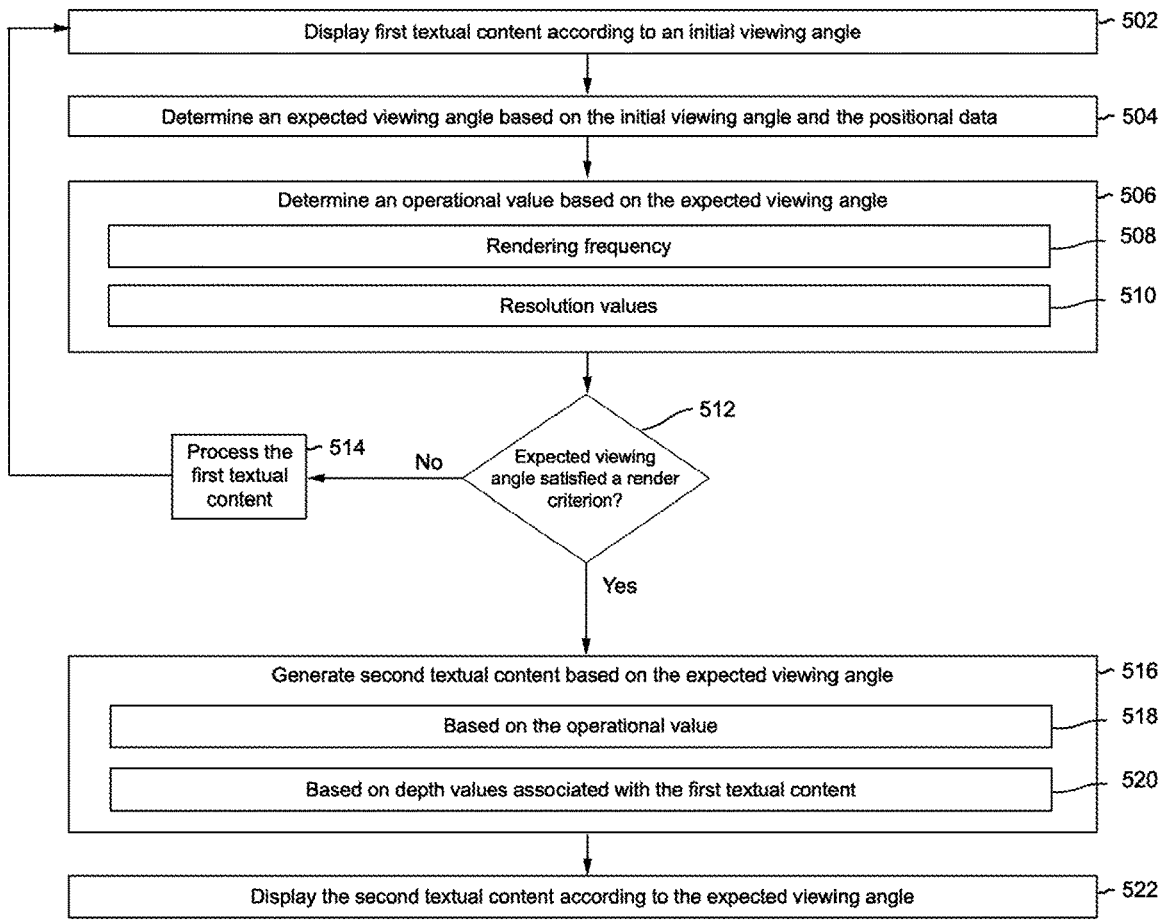
FIG. 5 is an example of a flow diagram of a method of generating textual content based on an expected viewing angle in accordance with some implementations.

FIG. 5 is an example of a flow diagram of a method 500 of generating textual content based on an expected viewing angle in accordance with some implementations. In various implementations, the method 500 or portions thereof are performed by an electronic device (e.g., the electronic device 310 illustrated in FIGS. 3A-3D). In various implementations, the method 500 or portions thereof are performed by a mobile device, such as a smartphone, tablet, or wearable device. In various implementations, the method 500 or portions thereof are performed by a head-mountable device (HMD) including a display. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 502, the method 500 includes displaying first textual content according to an initial viewing angle. In some implementations, the first textual content is world-locked or body-locked. For example, with reference to FIG. 3A, the electronic device 310 displays, on the display 312, the first textual content 315 according to the initial viewing angle $\theta_i$ and world-locked to the physical table 204. In some implementations, the method 500 includes presenting an XR environment that includes the first textual content. For example, with reference to FIG. 4, the electronic device 410 includes the image sensor 402 that captures image data 404 of the physical environment 401, and the electronic device 410 composites the textual content 452 with the image data 404 (e.g., pass-through image data).

As represented by block 504, while displaying the first textual content according to the initial viewing angle, the method 500 includes determining an expected viewing angle based on the initial viewing angle and positional data from a positional sensor. The positional data indicates a positional change of the electronic device. For example, with reference to FIG. 4, the expected viewing angle system 430 receives the positional data 422 from the positional sensor 420. Based on the positional data 422, the expected viewing angle system 430 determines an expected viewing angle $\theta_e$ that is different from the initial viewing angle. As another example, with reference to FIGS. 3C and 3D, based on positional data that is generated as a result of the movement of the electronic device 310, the electronic device 310 determines (e.g., anticipates) the second viewing angle $\theta_2$ before the electronic device 310 reaches the second viewing angle $\theta_2$.

As represented by block 506, in some implementations, the method 500 includes determining an operational value for the rendering system based on the expected viewing angle. The rendering system may use the operational value in order to generate updated textual content, as described with reference to block 518.

For example, as represented by block 508, the operational value indicates a rendering frequency at which the rendering system generates updated textual content. For example, the rendering frequency may correspond to a GPU clock rate, or a FPS rate associated with the GPU. As one example, with reference to FIG. 4, the operational value 446 indicates a rendering frequency that is proportional to the expected viewing angle $\theta_e$. Accordingly, based on the operational value 446, the rendering system 450 may generate the textual content 452 at a higher frequency when the difference between the current viewing angle and the expected viewing angle $\theta_e$ is larger.

As another example, as represented by block 510, the operational value indicates a plurality of resolution values respectively associated with a plurality of portions of textual content. In some implementations, a first portion of the textual content is associated with a first resolution value of the plurality of resolution values, and a second portion of the textual content is associated with a second resolution value of the plurality of resolution values. The first resolution value may be different from the second resolution value. In some implementations, the first portion of the textual content is associated with a first depth that is lower than a second depth associated with the second portion of the textual content. The first resolution value may be greater than the second resolution value based on the first depth being lower than the second depth. For example, with reference to FIGS. 3B and 3C, based on the movement of the electronic device 310, the electronic device 310 determines that the third depth 316c, which is associated with "o," is lower than the fourth depth 316d, which is associated with "H." Accordingly, the electronic device 310 determines an operational value indicating to render the "o" at a higher resolution (e.g., a higher pixel density) than with respect to rendering of the "H."

As represented by block 512, the method 500 includes determining whether or not the expected viewing angle satisfies a render criterion. In some implementations, determining that the expected viewing angle satisfies the render criterion includes comparing the initial viewing angle against the expected viewing angle. For example, the expected viewing angle satisfies the render criterion when a difference between the initial viewing angle and the expected viewing angle exceeds a threshold. As another example, with reference to FIG. 4, the rendering system manager 440 determines whether or not the expected viewing angle $\theta_e$ satisfies the render criterion 442. The rendering system manager 440 sets the render flag 444 to '1' when the render criterion 442 is satisfied, and sets the render flag 444 to '0' when the render criterion 442 is not satisfied. Accordingly, according to various implementations, the rendering system manager 440 manages the frequency at which the rendering system 450 renders the object(s) 460.

Based on determining that the expected viewing angle satisfies the render criterion ("Yes" decision), the method 500 proceeds to block 516. On the other hand, based on determining that the expected viewing angle does not satisfy the render criterion ("No" decision), the method 500 proceeds to block 514 and/or reverts back to block 502.

As represented by block 514, in some implementations, the method 500 includes processing the first textual content while an electronic device is associated with an intermediate viewing angle that is between the initial viewing angle and the expected viewing angle. Examples of the processing include image warping, image scaling, image filtering, and/or other image processing techniques. To that end, the method 500 includes detecting, based on the positional data, that the electronic device is associated with the intermediate viewing angle. In response to detecting that the electronic device is associated with the intermediate viewing angle, the method 500 includes processing the first textual content based on the intermediate viewing angle in order to display processed textual content on the display. Processing the first textual content before the rendering system generates updated textual content enabling the rendering system to reduce resource utilization. Moreover, by reverting back to block 502, the method 500 includes maintaining display of the first textual content, and foregoing generation of additional textual content, thereby further reducing resource utilization by the rendering system.

As represented by block 516, the method 500 includes generating, via the rendering system, second textual content based on the expected viewing angle. For example, with reference to FIGS. 3B and 3C, the electronic device 310 generates the second textual content 320 based on the first viewing angle $\theta_1$. Notably, the electronic device 310 generates the second textual content 320 before reaching the first viewing angle $\theta_1$, in order to avoid or reduce content distortion. In other words, the electronic device 310 proactively generates the second textual content 320.

The first textual content and the second textual content may be associated with a common object. For example, with reference to FIG. 4, the object(s) 460 includes a particular textual object "Hello" having a particular font type and size, and the rendering system 450 renders the particular textual object in order to generate the first textual content and the second textual content. As one example, in order to generate the second textual content, the rendering system 450 performs a perspective-shifted rendering of the particular textual object based on the expected viewing angle.

As represented by block 518, in some implementations, generating the second textual content is according to the operational value. For example, with reference to FIG. 4, the rendering system manager 440 provides the operational value 446 to the rendering system 450, which renders the object(s) 460 based on the operational value 446. As described with reference to blocks 506-510, the operational value may indicate a rendering frequency, resolution values for respective portions of textual content, etc.

As represented by block 520, in some implementations, generating the second textual content is based on a plurality of depth values respectively associated with a plurality of portions of the first textual content. For example, with reference to FIG. 4, the rendering system 450 generates the plurality of depth values while drawing a 3D environment including the first textual content, and stores the plurality of depth values in the depth buffer 470. Subsequently, the rendering system 450 may obtain the plurality of depth values in order to generate the second textual content. In some implementations, generating the second textual content includes generating a first portion of the second textual content based on a first one of the plurality of depth values that is associated with a corresponding portion of the first textual content. Moreover, in some implementations, generating the second textual content further includes generating a second portion of the second textual content based on a second one of the plurality of depth values that is associated with a corresponding portion of the first textual content.

As represented by block 522, the method 500 includes displaying the second textual content according to the expected viewing angle. For example, displaying the second textual content is in response to detecting, based on positional data, that an electronic device is associated with (e.g., reaches) the expected viewing angle. In some implementations, displaying the second textual content includes replacing the first textual content with the second textual content. For example, with reference to FIGS. 3C and 3D, the third textual content 322 replaces the second textual content 320 on the display. Because the third textual content 322 and the second textual content 320 are both world-locked to the physical table 204, the third textual content 322 is perspective-shifted with respect to the second textual content 320. Namely, the third textual content 322 is nearer to the left edge of the viewable region 314 than is the second textual content 320. In some implementations, the method 500 may include, in response to detecting the electronic device is associated with the expected viewing angle, replacing the processed textual content on the display with the second textual content.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be implemented in such program instructions, although some or all of the disclosed functions may alternatively be implemented in application-specific circuitry (e.g., ASICs or FPGAs or GP-GPUs) of the computer system. Where the computer system includes multiple computing devices, these devices may be co-located or not co-located. The results of the disclosed methods and tasks may be persistently stored by transforming physical storage devices, such as solid-state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various implementations described above can be combined to provide further implementations. Accordingly, the novel methods and systems described herein may be implemented in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed:

1. A method comprising:
   at an electronic device including one or more processors, a non-transitory memory, a positional sensor, a rendering system, and a display:
   while displaying, on the display, first textual content according to an initial viewing angle, determining an expected viewing angle based on the initial viewing angle and positional data from the positional sensor, wherein the positional data indicates a positional change of the electronic device, and wherein the initial viewing angle is different from the expected viewing angle;

detecting, based on the positional data, that the electronic device is associated with an intermediate viewing angle that is between the initial viewing angle and the expected viewing angle;

in response to detecting that the electronic device is associated with the intermediate viewing angle, in accordance with a determination that the expected viewing angle satisfies a render criterion, generating, via the rendering system, second textual content based on the expected viewing angle; and displaying, on the display, the second textual content according to the expected viewing angle.

2. The method of claim 1, wherein the determination that the expected viewing angle satisfies the render criterion includes comparing the initial viewing angle against the expected viewing angle.

3. The method of claim 2, wherein the expected viewing angle satisfies the render criterion when a difference between the initial viewing angle and the expected viewing angle exceeds a threshold.

4. The method of claim 1, further comprising determining an operational value for the rendering system based on the expected viewing angle, wherein generating the second textual content is according to the operational value.

5. The method of claim 4, wherein the operational value indicates a rendering frequency at which the rendering system generates the second textual content.

6. The method of claim 4, wherein the operational value indicates a plurality of resolution values respectively associated with a plurality of portions of the second textual content.

7. The method of claim 6, wherein a first portion of the second textual content is associated with a first resolution value of the plurality of resolution values, and wherein a second portion of the second textual content is associated with a second resolution value of the plurality of resolution values, the first resolution value being different from the second resolution value.

8. The method of claim 7, wherein the first portion of the second textual content is associated with a first depth that is lower than a second depth associated with the second portion of the second textual content, and wherein the first resolution value is greater than the second resolution value based on the first depth being lower than the second depth.

9. The method of claim 1, further comprising, obtaining, from the non-transitory memory, a plurality of depth values respectively associated with a plurality of portions of the first textual content, wherein generating the second textual content includes generating a first portion of the second textual content based on a first one of the plurality of depth values that is associated with a corresponding portion of the first textual content.

10. The method of claim 9, wherein generating the second textual content further includes generating a second portion of the second textual content based on a second one of the plurality of depth values that is associated with a corresponding portion of the first textual content.

11. The method of claim 1, wherein the electronic device includes an image sensor, the further comprising:

obtaining, from the image sensor, image data of a physical environment; and displaying, on the display, an extended reality (XR) environment by compositing the image data with the second textual content.

12. The method of claim 1, further comprising:

detecting, based on the positional data, that the electronic device is associated with the expected viewing angle; and in response to detecting the electronic device is associated with the expected viewing angle, replacing the first textual content on the display with the second textual content.

13. The method of claim 1, wherein generating the second textual content includes warping the first textual content.

14. The method of claim 1, further comprising, in accordance with a determination that the expected viewing angle does not satisfy the render criterion:

maintaining display of the first textual content according to the initial viewing angle; and foregoing generation of the second textual content.

15. An electronic device comprising:

a positional sensor that generates positional data;

an expected viewing angle system to determine an expected viewing angle based on an initial viewing angle and the positional data, wherein the positional data indicates a positional change of the electronic device, wherein the initial viewing angle is associated with first textual content, and wherein the initial viewing angle is different from the expected viewing angle;

a rendering system manager to determine whether or not the expected viewing angle satisfies a render criterion;

a rendering system to generate second textual content based on whether or not the expected viewing angle satisfies the render criterion, wherein generating the second textual content includes shifting the perspective of the first textual content based on the expected viewing angle; and a display to display the second textual content from the rendering system.

16. The electronic device of claim 15, wherein the rendering system manager:

directs the rendering system to generate the first textual content based on the expected viewing angle not satisfying the render criterion, the first textual content being associated with the initial viewing angle; and directs the rendering system to generate the second textual content based on the expected viewing angle satisfying the render criterion, the second textual content being associated with the expected viewing angle.

17. The electronic device of claim 16, wherein the rendering system manager directs the rendering system to generate the first textual content by providing the rendering system a render flag having a value of 0, and wherein the rendering system manager directs the rendering system to generate the second textual content by providing the rendering system the render flag having a value of 1.

18. The electronic device of claim 15, wherein the rendering system manager determines an operational value based on the expected viewing angle, and provides the operational value to the rendering system, and wherein the rendering system generates the second textual content further based on the operational value.

19. The electronic device of claim 15, wherein the expected viewing angle system detects, based on the positional data, that the electronic device is associated with an intermediate viewing angle that is between the initial viewing angle and the expected viewing angle, and wherein the electronic device further comprises a processing system that processes the first textual content based on the intermediate viewing angle.

20. The electronic device of claim 15, wherein determining the expected viewing angle occurs when the electronic device is associated with an intermediate viewing angle that is between the initial viewing angle and the expected viewing angle.

21. A non-transitory computer readable storage medium storing one or more programs, the one or more programs comprising instructions, which, when executed by an electronic device including a positional sensor, a rendering system, and a display, cause the electronic device to:
- while displaying, on the display, first textual content according to an initial viewing angle, determine an expected viewing angle based on the initial viewing angle and positional data from the positional sensor, wherein the positional data indicates a positional change of the electronic device, and wherein the initial viewing angle is different from the expected viewing angle;
- in accordance with a determination that the expected viewing angle satisfies a render criterion, generate, via the rendering system, second textual content based on the expected viewing angle, wherein generating the second textual content includes shifting the perspective of the first textual content based on the expected viewing angle; and
- display, on the display, the second textual content according to the expected viewing angle.

\* \* \* \* \*